(12) United States Patent
Shibasaki

(10) Patent No.: US 7,990,442 B2
(45) Date of Patent: Aug. 2, 2011

(54) IMAGE PICKUP DEVICE AND NOISE REDUCTION METHOD THEREOF

(75) Inventor: Tetsuya Shibasaki, Kodaira (JP)

(73) Assignee: Hitachi Kokusai Electric Inc., Tokyo (JP)

(*) Notice: Subject to any disclaimer, the term of this patent is extended or adjusted under 35 U.S.C. 154(b) by 787 days.

(21) Appl. No.: 12/007,917

(22) Filed: Jan. 17, 2008

(65) Prior Publication Data

US 2008/0170138 A1 Jul. 17, 2008

(30) Foreign Application Priority Data

Jan. 17, 2007 (JP) ................................. 2007-007533

(51) Int. Cl.
*H04N 5/217* (2006.01)
(52) U.S. Cl. ......... 348/249; 348/241; 348/248; 348/250
(58) Field of Classification Search ........................ None
See application file for complete search history.

(56) References Cited

U.S. PATENT DOCUMENTS

| 4,608,608 A * | 8/1986 | Nishizawa et al. ........... 348/248 |
| 2005/0073597 A1 * | 4/2005 | Rengakuji et al. ............ 348/241 |
| 2007/0242145 A1 * | 10/2007 | Hazelwood et al. .......... 348/249 |

* cited by examiner

*Primary Examiner* — David L Ometz
*Assistant Examiner* — Angel L Garces-Rivera
(74) *Attorney, Agent, or Firm* — Bacon & Thomas, PLLC

(57) ABSTRACT

An image pickup device having an electron multiplying-charge coupled device includes a control unit for controlling an electron multiplication factor of the electron multiplying-charge coupled device; an obtaining unit for obtaining signals output from predetermined pixels of the electron multiplying-charge coupled device; and an averaging unit for performing an inter-line averaging process of the signals obtained by the obtaining unit. The device further includes a suppression unit for performing low-level and high-level suppressions on the signal averaged by the averaging unit based on the electron multiplication factor of the electron multiplication factor control unit; an acquisition unit for acquiring image signals output from the pixels other than the predetermined pixels of the electron multiplying-charge coupled device; and a subtractor for subtracting the signal suppressed by the suppression unit from the image signals acquired by the acquisition unit.

14 Claims, 9 Drawing Sheets

IMAGE PICKUP DEVICE AND NOISE REDUCTION METHOD THEREOF

FIELD OF THE INVENTION

The present invention relates to an image pickup device such as a television camera or the like having a charge coupled device; and, more particularly, to a method for reducing noises such as a smear and the like which are included in an image signal output from an electron multiplying-charge coupled device.

BACKGROUND OF THE INVENTION

Conventionally, there has been an image pickup device which is configured in such a manner that an optical image is formed on a charge coupled device for converting light into an electric signal by using a lens, wherein a device for adjusting the amount of transmitted light is provided on an optical path corresponding to each minimum block of the charge coupled device. The image pickup device has a control function of reducing the amount of light received by each photoelectric conversion unit of the charge coupled device into $1/\alpha$ ($\alpha$ is an integer of 1 or greater) so that the amount of received light can fall within a particular dynamic range of the charge coupled device and has a function of amplifying an output corresponding to each minimum block by $\alpha$ times at the rear end of the charge coupled device (see, for example, Japanese Patent Laid-open Application No. H7-023283).

However, according to the aforementioned prior art, the device for adjusting the amount of transmitted light needs to be installed on the optical path corresponding to each minimum block of the charge coupled device.

SUMMARY OF THE INVENTION

The present invention provides an image pickup device and method capable of reducing noises such as smear and the like output from a charge coupled device without using a special light amount adjusting device.

In accordance with an aspect of the present invention, there is provided image pickup device having an electron multiplying-charge coupled device, including: a control unit for controlling an electron multiplication factor of the electron multiplying-charge coupled device; an obtaining unit for obtaining signals output from predetermined pixels of the electron multiplying-charge coupled device; an averaging unit for performing an inter-line averaging process of the signals obtained by the obtaining unit; a suppression unit for performing low-level and high-level suppressions on the signal averaged by the averaging unit based on the electron multiplication factor of the electron multiplication factor control unit; an acquisition unit for acquiring image signals output from the pixels other than the predetermined pixels of the electron multiplying-charge coupled device; and a subtractor for subtracting the signal suppressed by the suppression unit from the image signals acquired by the acquisition unit.

The image pickup device may further include a comparison unit for comparing a level of the signal averaged by the averaging unit with a predetermined level; and a switching unit for cutting off the output of the suppression unit according to a comparison result of the comparison unit.

In accordance with another aspect of the present invention, there is provided a noise reduction method of an image pickup device having an electron multiplying-charge coupled device, the method including the steps of: controlling an electron multiplication factor of the electron multiplying-charge coupled device; obtaining signals output from predetermined pixels of the electron multiplying-charge coupled device; performing an inter-line averaging process on the obtained signals; performing low-level and high-level suppressions on the averaged signal based on the electron multiplication factor; acquiring image signals output from the pixels other than the predetermined pixels of the electron multiplying-charge coupled device; and subtracting the suppressed signal from the acquired image signals.

The noise reduction method, may further include the steps of: comparing a level of the averaged signal with a predetermined level; and subtracting the suppressed signal from the image signals according to a comparison result.

In accordance with the aspects of the present invention, the smear signal is obtained from the predetermined pixels of the quasi-optical black area of the charge coupled device, and the low-level and high-level suppressions are performed on the obtained smear signal based on the image signal level of the pixels other than the predetermined pixels. Further, the suppressed smear signal is subtracted from the image signal level, so that the image signal from which noises such as the smear signal have been reduced can be obtained without an optical black area of the charge coupled device.

BRIEF DESCRIPTION OF THE DRAWINGS

The objects and features of the present invention will become apparent from the following description of embodiments given in conjunction with the accompanying drawings, in which.

DETAILED DESCRIPTION OF THE EMBODIMENTS

Hereinafter, embodiments of the present invention will be described in detail with reference to the accompanying drawings which form a part hereof.

First, an image pickup device in accordance with an embodiment of the present invention will be described with reference to FIGS. 1 and 2.

Figure 1:
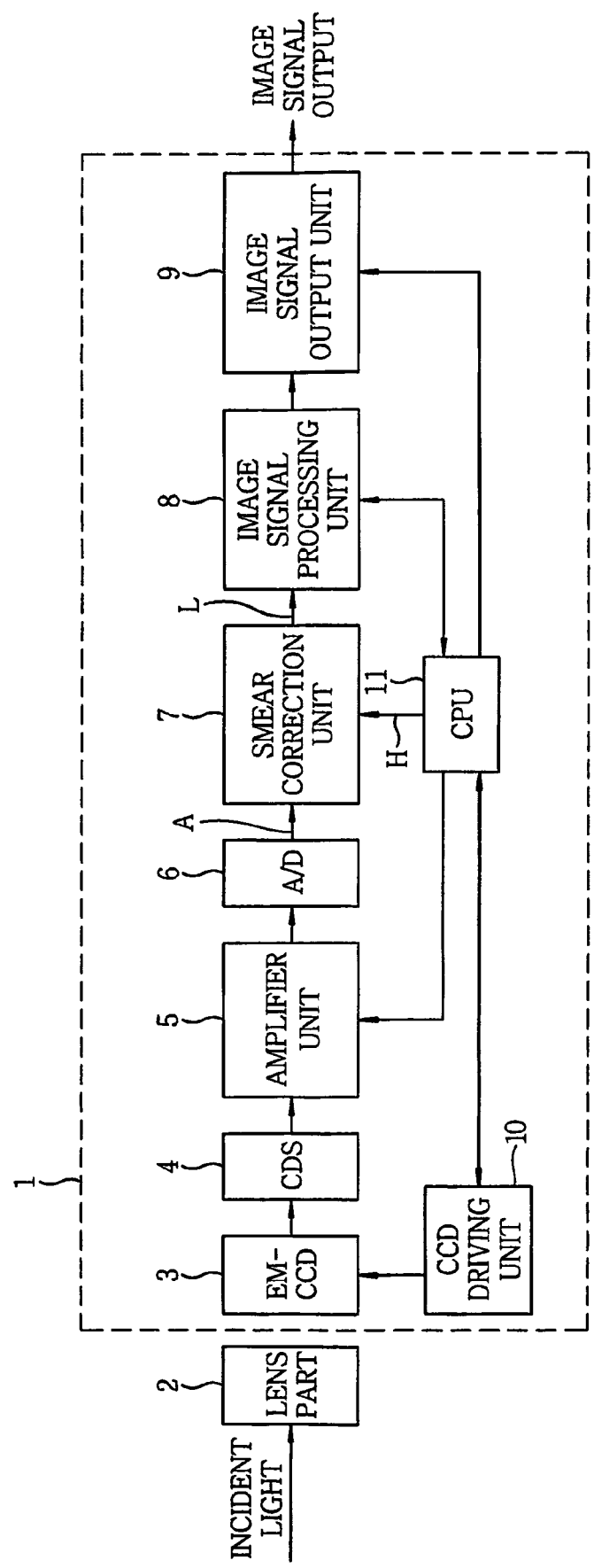
FIG. 1 is a block diagram showing an image pickup device in accordance with an embodiment of the present invention.

FIG. 1 is a block diagram showing the image pickup device in accordance with the embodiment of the present invention.

In FIG. 1, a reference numeral 1 indicates an image pickup device, a reference numeral 2 denotes a lens unit for forming an image of incident light, a reference numeral 3 is an EM-CCD (Electron Multiplying-Charge Coupled Device) for converting light entering from the lens unit 2 into an electric signal, and a reference numeral 4 denotes a CDS (Correlated Double Sampling) unit for eliminating noises from the signal output from the EM-CCD 3.

Further, a reference numeral 5 indicates an amplifier unit for adjusting a gain of a signal output from the CDS unit 4, a reference numeral 6 is an A/D converter (analog digital converter) for converting an analog signal output from the amplifier unit 5 into a digital signal A, and a reference numeral 7 denotes a smear correction unit for detecting and correcting a noise signal such as smear and the like output from the EM-CCD 3.

Furthermore, a reference numeral 8 is a image signal processing unit for performing various image processings on a signal L output from the smear correction unit 7, a reference numeral 9 denotes an image signal output unit for outputting an image signal of a predetermined type by converting a signal output from the image signal processing unit 8, a reference numeral 10 indicates a CCD driving unit for driving the EM-CCD 3 and performing gain control of the electron multiplication, and a reference numeral 11 denotes a CPU (Central Processing Unit) for controlling each unit of the image pickup device 1. Further, the CPU 11 controls the smear correction unit 7 by a signal H.

The image signal of the predetermined type which is output from the image signal output unit 9 is a motion image or a still image of, e.g., an NTSC (National Television System Committee) type, a PAL (Phase Alternating by Line) type, an HDTV (High Definition TeleVision) type or the like.

Figure 2:
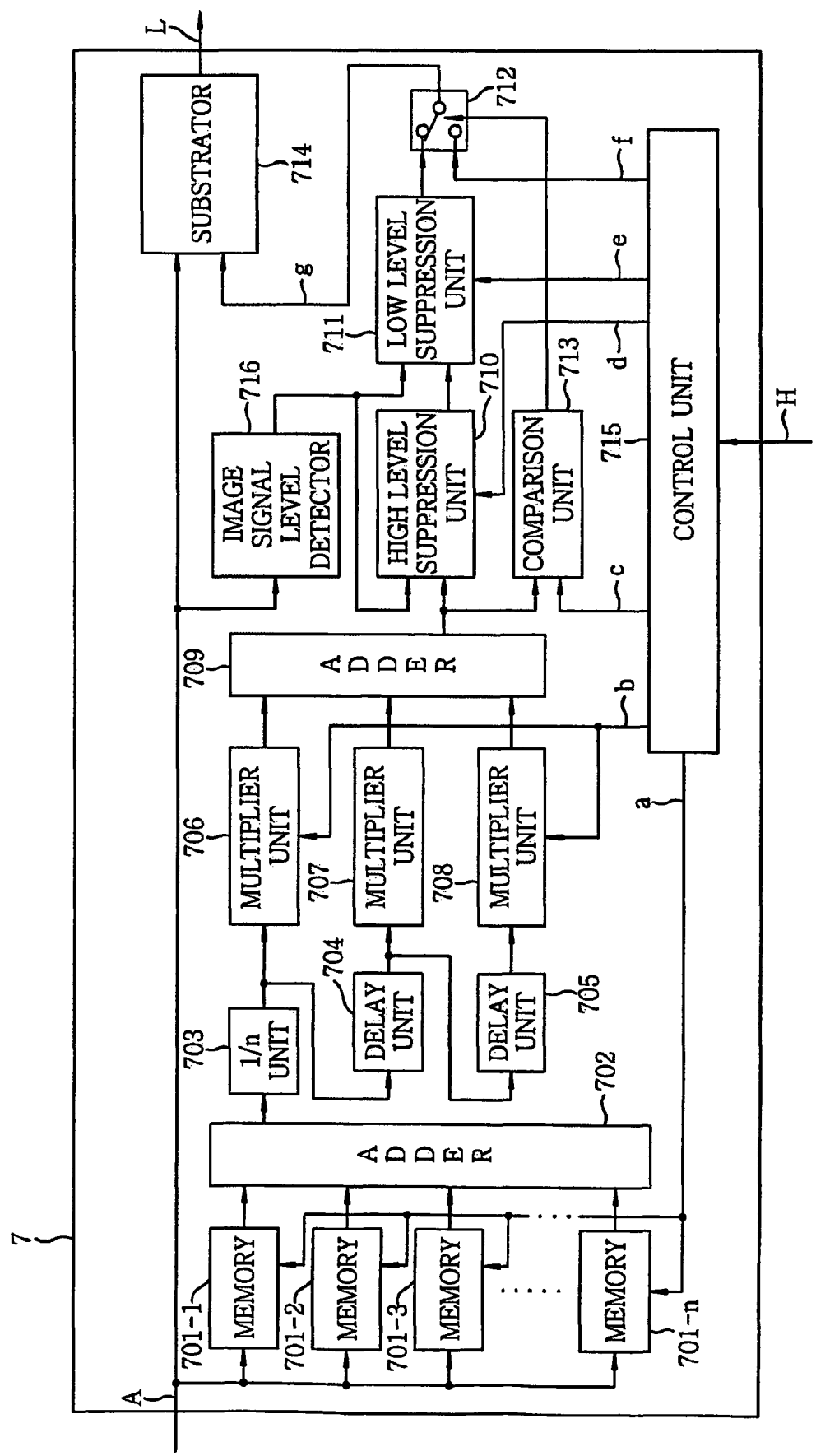
FIG. 2 is a block diagram showing a smear correction unit in accordance with the embodiment of the present invention.

FIG. 2 is a detailed block diagram of the smear correction unit 7 in FIG. 1.

In FIG. 2, reference numerals 701-1 to 701-n (n is a natural number) denote memory units each for storing digital signals corresponding to a single scanning line (1H). A reference numeral 702 indicates an adder for adding output signals of the memory units 701-1 to 701-n, and a reference numeral 703 is a 1/n unit for multiplying an output signal of the adder 702 by 1/n. Reference numerals 704 and 705 denote delay units each of which delays an input signal thereto by the time corresponding to a single pixel, reference numerals 706 to 708 are multiplier units each for multiplying an input signal thereto by a predetermined multiplication factor and a reference numeral 709 denotes an adder for adding output signals of the multiplier units 706 to 708. A reference numeral 710 indicates a high-level suppression unit for applying a predetermined suppression to a signal equal to or higher than a predetermined level, which is output from the adder 709, and a reference numeral 711 denotes a low-level suppression unit for applying a predetermined suppression to a signal equal to or less than a preset level, which is output from the high-level suppression unit 710. Further, a reference numeral 713 indicates a comparison unit for comparing a level of the signal output from the adder 709 with a predetermined signal level, a reference numeral 712 denotes a switching unit for switching an output signal according to a comparison result which is output from the comparison unit 713, and a reference numeral 714 is a subtractor for subtracting a signal g from the signal A. A reference numeral 715 denotes a control unit for outputting signals a, b, c, d, e and f according to the input signal H. A reference numeral 716 is an image signal level detector for detecting, from the signal A, an average level of, e.g., a single frame or field of an image signal output from pixels of an image pickup area other than a smear signal detection area, which will be described later.

The operation of the embodiment of the present invention will now be described with reference to FIG. 1.

The EM-CCD 3 of the image pickup device 1 photoelectrically converts the incident light imaged on the photoelectric conversion units by the lens unit 2 and outputs the obtained electric signal to the CDS unit 4. The CDS unit 4 removes noises from the signal output from the EM-CCD 3 and outputs the resultant signal to the amplifier unit 5. The amplifier unit 5 amplifies the signal output from the CDS unit 4 according to a gain control signal output from the CPU 11 and outputs the amplified signal to the A/D converter 6. The A/D converter 6 converts the analog signal output from the amplifier unit 5 into a digital signal of, e.g., 10 bits and outputs the digital signal A to the smear correction unit 7.

The smear correction unit 7 detects and corrects the smear signal originated from the EM-CCD 3, and outputs the signal L to the image signal processing unit 8. Further, the image signal processing unit 8 performs various image processings on the signal L output from the smear correction unit 7 and outputs the resultant signal to the image signal output unit 9. The image signal output unit 9 converts the signal output from the image signal processing unit 8 into an image signal of the predetermined type and then outputs it. The CCD driving unit 10 outputs a signal for driving the EM-CCD 3 based on a control signal output from the CPU 11. Further, the CPU 11 outputs the signal H for controlling the smear correction unit 7.

The CCD driving unit 10 transmits position information of the pixel read out from the EM-CCD 3 to the CPU 11. Alternatively, the CPU 11 may instruct a read starting point of the signal to be output from the EM-CCD 3 to the CCD driving unit 10. According to the image signal output from the image signal processing unit 8, the CPU 11 outputs a signal for controlling an amplification factor to the amplifier unit 5 and outputs a signal for performing the gain control of electron multiplication of the EM-CCD 3 to the CCD driving unit 10. Moreover, the CPU 11 sends the signal H with the position information of the pixel read out from the EM-CCD 3 and the information of the gain ratio of the electron multiplication of the EM-CCD 3 to the control unit 715, and the signals a, b, c, d, e, and f are output from the control unit 715 based thereon.

The smear will now be described. The smear refers to a blur phenomenon of the light which appears above and below spotlight when the spotlight, i.e. a high-luminance object is photographed by the charge coupled device. The smear occurs even in the illuminance equal to or less than the saturated illuminance of the charge coupled device. Further, the smear is proportional to the illuminance of the photographing light. The smear affects all pixels disposed in the vertical direction passing through the pixel photographing the spotlight.

Figure 5:
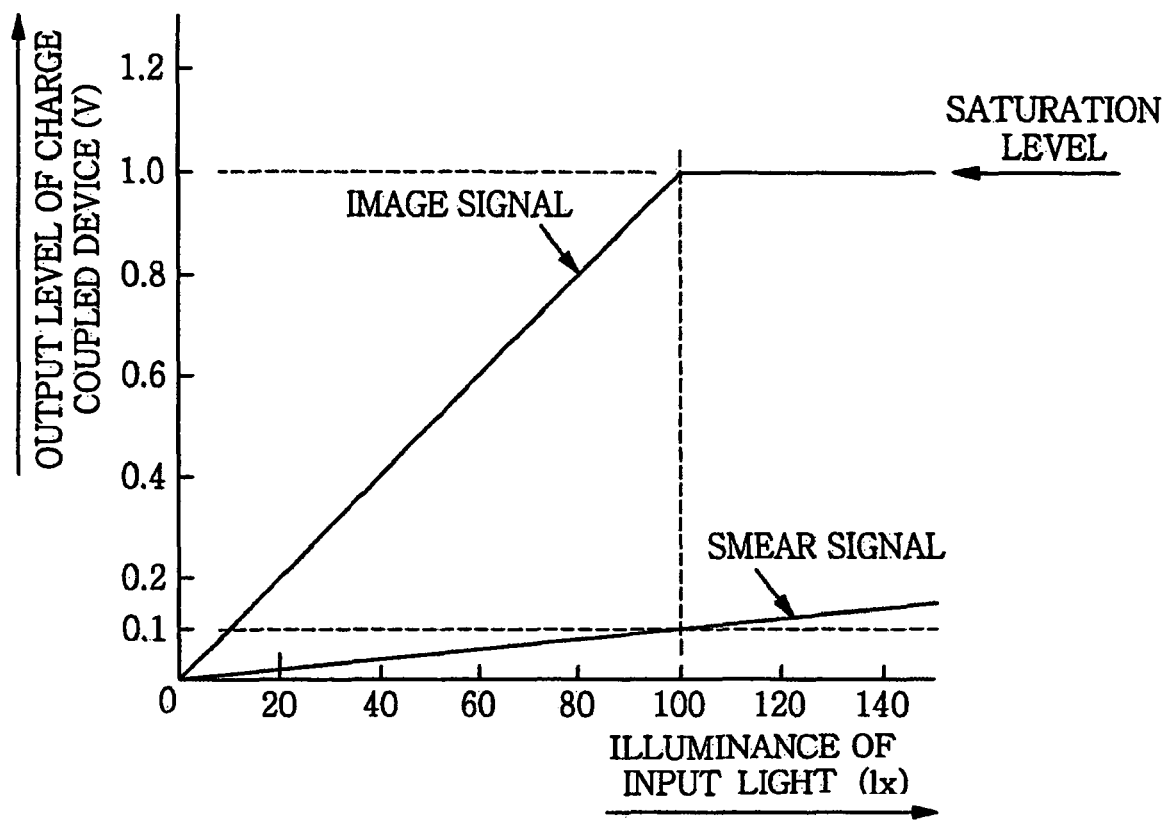
FIG. 5 is a diagram for explaining a relationship between an image signal outputted from the charge coupled device and a smear signal.

FIG. 5 shows an example explaining a relationship between the image signal which is output from the charge coupled device and the smear signal. The image signal of the charge coupled device is saturated at the incident light illuminance of 100 lux and an output saturation level of the CCD is 1.0 V. The smear signal is 10% of the image signal, but it still increases even after the image signal is saturated.

Figure 6:
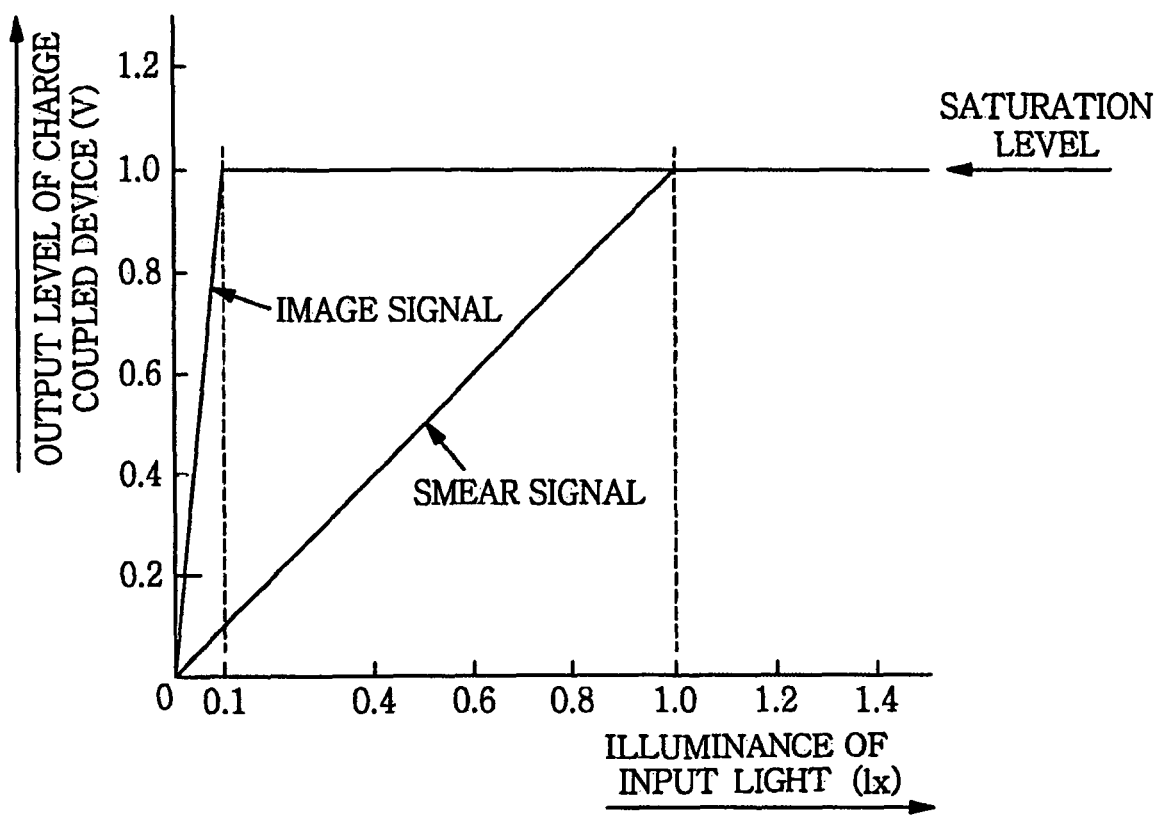
FIG. 6 is a diagram for explaining a relationship between an image signal outputted from an electron multiplying-charge coupled device and a smear signal.

FIG. 6 shows an example explaining a relationship between the image signal which is output from an electron multiplying-charge coupled device and the smear signal when a charge coupled device having characteristics exemplified in FIG. 5 is employed in the EM-CCD and electron multiplication factor is set to 1000 times. The image signal of the electron multiplying-charge coupled device is saturated at the incident light illuminance of 0.1 lux, and the saturation level is equal to 1.0 V. Further, the smear signal is equal to 10% of the image signal, but the smear signal increases even after the image signal is saturated. However, the smear signal is also saturated at 1.0 lux.

On the basis of such characteristics of the smear, the embodiment of the present invention carries out smear signal correction, wherein a smear signal is detected by rendering a selected portion of the image pickup area to be a quasi-optical black area which is equivalent to an area where pixels therein are light-shielded, and the smear signal is substracted from the image signal obtained by photoelectrically converting the incident light.

Figure 7:
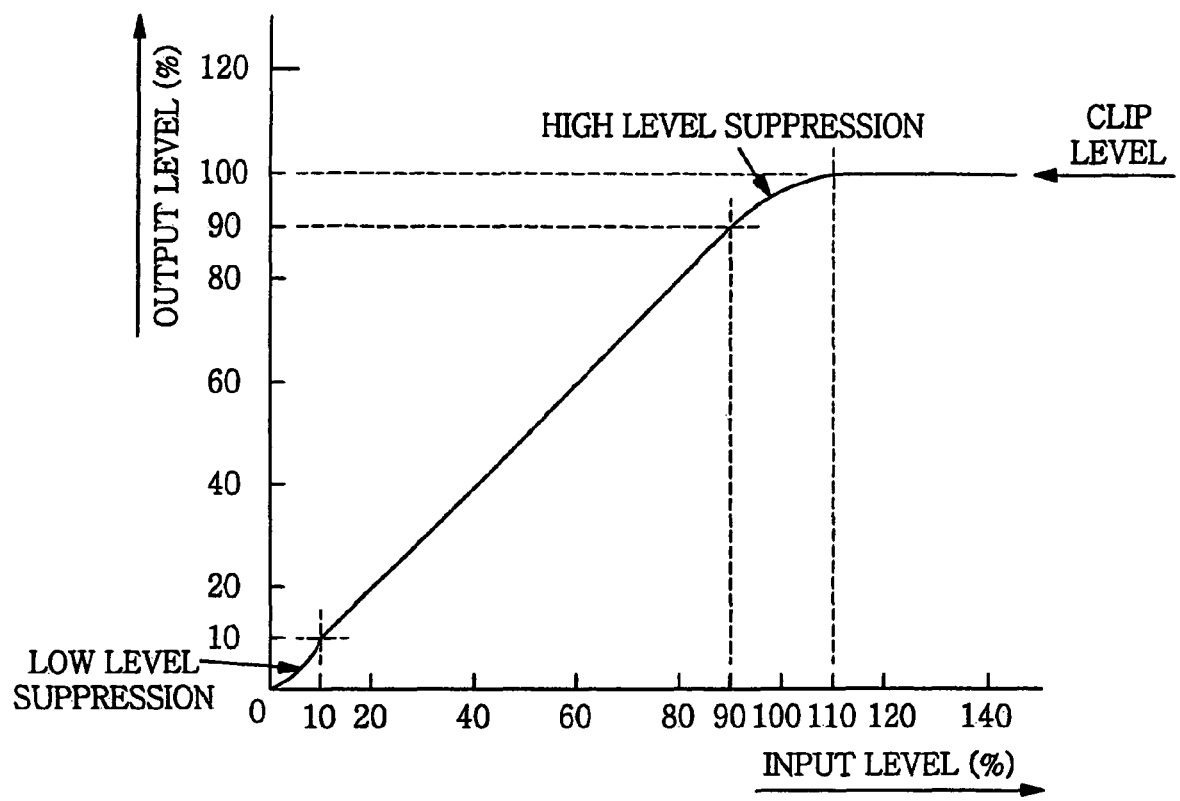
FIG. 7 is a diagram for explaining low-level and high-level suppressions of a smear correction signal in accordance with the embodiment of the present invention.

The operation of detection and correction of the smear signal output from the EM-CCD 3 in accordance with the embodiment of the present invention will now be described with reference to FIGS. 2 to 7. FIG. 7 is a diagram for explaining low-level and high-level suppressions of a smear correction signal in accordance with the embodiment of the present invention.

Figure 3:
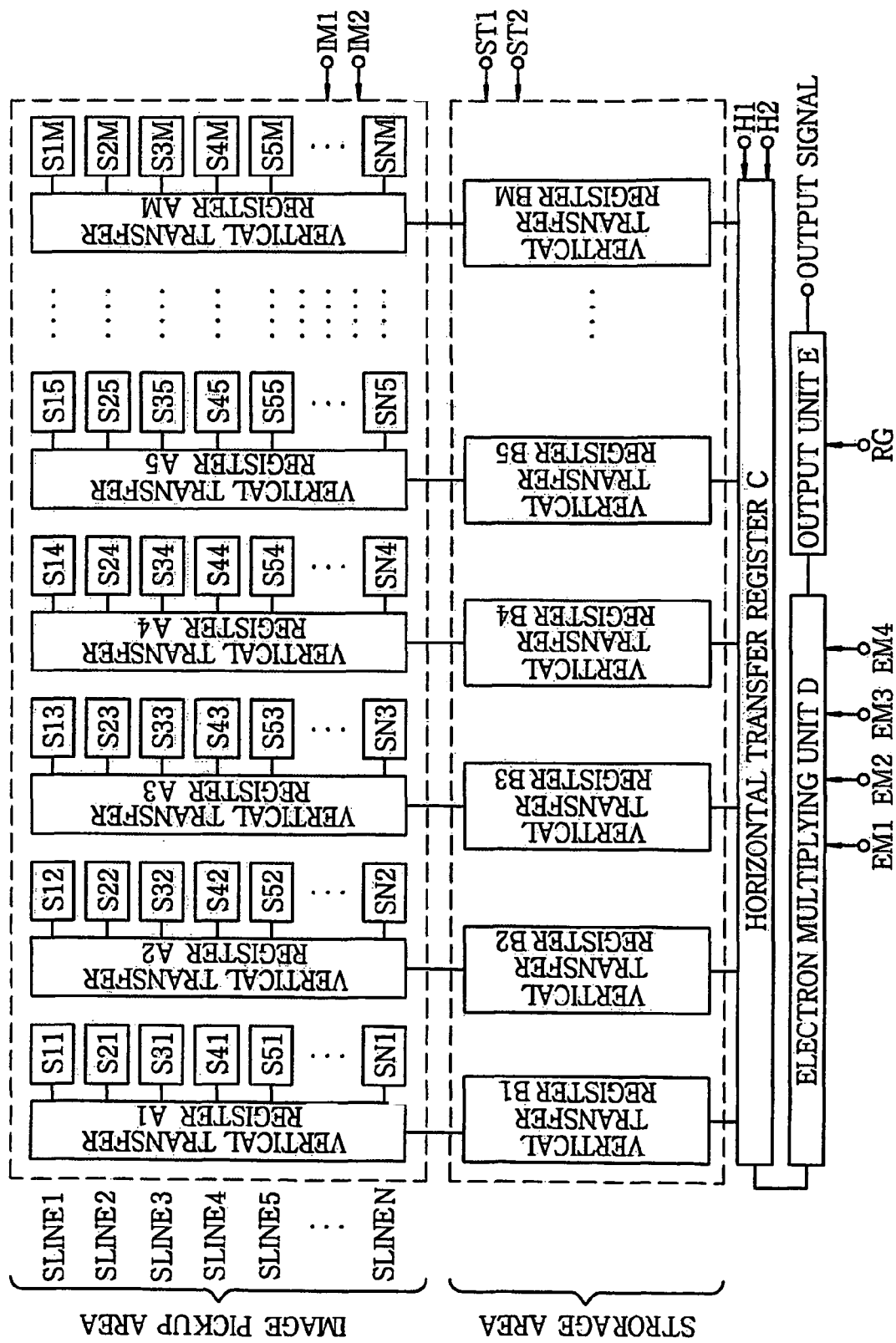
FIG. 3 is a diagram for explaining a pixel array of a charge coupled device.

FIG. 3 is a diagram for explaining major parts of the EM-CCD 3 shown in FIG. 1. The EM-CCD 3 is mainly formed of an image pickup area, a storage area, a horizontal transfer register C, an electron multiplying unit D and an output unit E. Since having the image pickup area and the storage area, the EM-CCD 3 is of a frame interline transfer type called as an FIT type. The image pickup area includes a plurality of pixels S11 to SNM for receiving and photoelectrically converting the incident light and M columns of vertical transfer resister parts A1 to AM and the control is performed by signals IM1 and IM2. The image pickup area of FIG. 3 shows the pixel array, wherein one square indicates one pixel and a numeral written in the square indicates a layout of the pixel. That is, i (i=1, ..., N) indicates the row and j (j=1, ..., M) indicates the column.

The vertical transfer registers of the charge coupled device of FIG. 3 are divided into the image pickup area and the storage area. In the image pickup area, the pixels of the first row are arranged in the order of S11, S12, S13, S14, S15, ..., and S1M, the pixels of the second row are arranged in the order of S21, S22, S23, S24, S25, ..., and S2M, the pixels of the third row are arranged in the order of S31, S32, S33, S34, S35, ..., and S3M, and the pixels of the $N^{th}$ row are arranged in the order of SN1, SN2, SN3, SN4, SN5, ..., and SNM. Here, M and N are natural numbers. Further, the signals of pixels are read is in the same order as that of the aforementioned pixel array. To be specific, the signals are read out in the order of S11, S12, S13, ..., and SNM. The storage area is formed of M columns of vertical transfer registers B1 to BM and the control is performed by signals ST1 and ST2.

The horizontal transfer register C reads image signals transferred from the vertical transfer registers B1 to BM of the storage area on a pixel by pixel basis, and the control is carried out by signals H1 and H2. The electron multiplying unit D executes the electron multiplication of the image signals output from the horizontal transfer register C and the control is performed by signals EM1 to EM4. The output unit E outputs the image signals to the outside of the EM-CCD 3 and a signal RG resets the output unit E to generate a reset level.

In the embodiment of the present invention, the image signals and the smear signals are read out from the charge coupled device shown in FIG. 3 on a field or frame unit basis. The smear signals are generated when the vertical transfer register of the image pickup area is exposed to the incident light of high illuminance. Therefore, by driving the charge coupled device such that the image signals are not read out from predetermined pixels or lines of the image pickup area, only the smear signals generated in the vertical transfer register can be read. By means of this charge coupled device driving method, a predetermined pixel area can serve as a quasi-optical black area without requiring an optical black area, i.e. a light-shielded pixel area.

Figure 4:
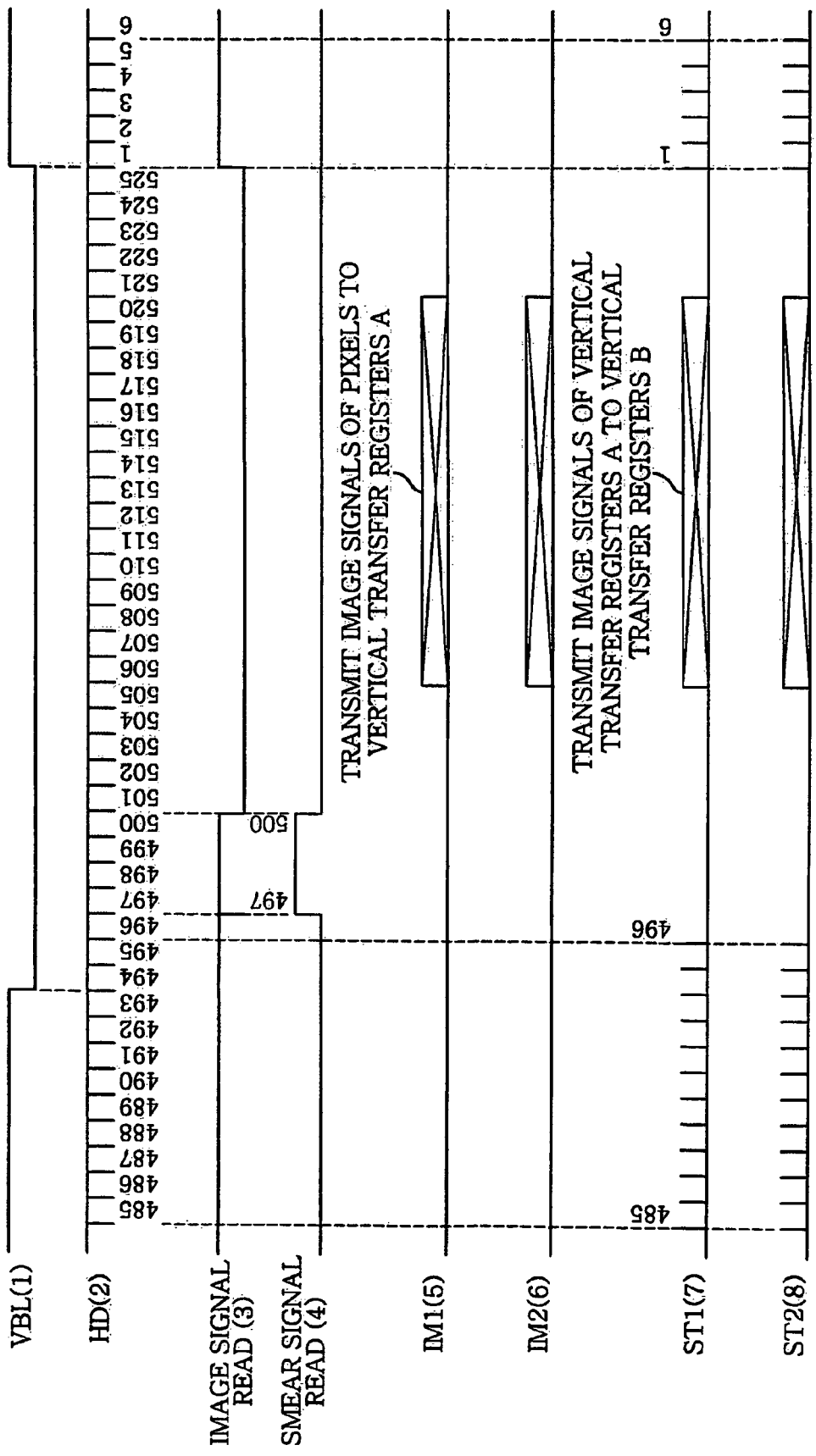
FIG. 4 shows a timing chart to explain a driving method of the charge coupled device.

Next, a charge coupled device driving method for reading smear signals from the last n (=4 in this example) rows (referred to as "lines", herein after) of the image pickup area shown in FIG. 3, the last four lines serving as a quasi-optical black area, will be described with reference to FIGS. 3 and 4. FIG. 4 shows a timing chart to explain the driving method of the EM-CCD 3 in accordance with the embodiment of the present invention. Herein, it is assumed that the image pickup area has 500 lines, the total number of lines is 525, and progressive scanning is used.

The vertical transfer registers B1 to BM of the EM-CCD 3 usually transfer the whole lines in the image pickup area, i.e. the first line to the $500^{th}$ line. However, if a predetermined number of lines are controlled not to be transferred by the control of the vertical transfer pulses, the lines which are not transferred serve as signal lines of a black level, of which pixels do not output any signals. However, the smear signal which is generated in case of the incident light of high luminance can be output. That is, although the EM-CCD 3 does not have the optical black area where the pixels are light-shielded, a quasi-optical black area can be formed by controlling the vertical transfer.

In FIG. 4, a vertical blanking period represented by the logic-low state of VBL (1) is 32 lines, and the number of horizontal driving signals HD (2) is 525 since the total number of the lines is 525. A high-level period of an image signal read (3) of FIG. 4 refers to a period during which image signals of the 500 lines of the image pickup area are read out. A high-level period of a smear signal read (4) of FIG. 4 refers to a period of the four lines serving as the quasi-optical black area.

Signals IM1 (5) and IM2 (6) transfer the image signals of the pixels read from the $1^{st}$ to $496^{th}$ lines of the image pickup area to the vertical transfer registers A1 to AM. Further, signals ST1 (7) and ST2 (8) transfer the image signals and smear signals of the vertical transfer registers A1 to AM to the vertical transfer registers B1 to BM. The image signals of the vertical transfer registers B1 to BM are then transferred to the horizontal transfer register C by the pulses $1^{st}$ to $500^{th}$ of the signals ST1 (7) and ST2 (8) during the logic-high state of the next VBL (1). Accordingly, the signals of the $1^{st}$ to $496^{th}$ lines of the image pickup area can be transferred to the horizontal transfer register C. Even though the signals of the $497^{th}$ to $500^{th}$ lines of the image pickup area are not transferred to the horizontal transfer register C, the smear signals generated in case of the incident light of high illuminance can be output. That is, although the EM-CCD 3 is not provided with an optical black area where pixels are light-shielded, only the smear signal can be obtained by reading the signals from the pixels and driving the vertical transfer registers B1 to BM in this manner.

Even though each of the vertical transfer registers A1 to AM and B1 to BM has been described as being controlled by two-phase control signals in this embodiment, it may be controlled by four-phase control signals or the like. Further, although the embodiment has been described with respect to the progressive scanning, interlaced scanning may also be used.

The operation of detection and correction of the smear signals will now be described with reference to FIGS. 2 to 4.

The smear signals are generated when the vertical transfer register of the image pickup area of the EM-CCD 3 is exposed to the incident light of high illuminance. Therefore, by driving the charge coupled device such that the image signals are not read out from the predetermined pixels or lines of the image pickup area, only the smear signals generated in the vertical transfer resister can be read. However, since the smear signals can be viewed as being read out from the predetermined pixels in view of the driving method of the charge coupled device, it is assumed in the following description of the operation of this embodiment that the smear signals are read out from the predetermined pixels of the image pickup area.

First, the signal A is input to the smear correction unit 7 of FIG. 2. The signals of the pixels of the $497^{th}$ line in the predetermined smear signal detection area of FIG. 3 are stored into the memory unit 701-1 in FIG. 2. The signals of the pixels of the $498^{th}$ line in the predetermined smear signal detection area are stored into the memory unit 701-2, and the signals of the pixels of the $499^{th}$ line of the predetermined smear signal detection area are stored into the memory unit 701-3 in FIG. 2. In this manner, the signals of the pixels of the $500^{th}$ line of the predetermined smear signal detection area are sequentially stored into the memory unit 701-n.

The signals stored in the memory units 701-1 to 701-n are output each time when the signals of the pixels in the image pickup area of FIG. 3 are read out. That is, when the signals of the first column of the S1 line (S11), the first column of the S2 line (S21), the first column of the S3 line (S31), . . . , and the first column of the S496 line are read out, the memory units 701-1 to 701-n output the signals of the first column of the S497 line, the first column of the S498 line, the first column of the S499 line and the first column of the S500 line (SN1).

The storage and output of the memory units 701-1 to 701-n are controlled by the signal a, which is output from the control unit 715. The signals output from the memory units 701-1 to 701-n are summed by the adder 702 and multiplied by ¼ time by the 1/n unit 703. The average of the signals for each column of lines in the predetermined smear signal detection area can be executed by the memory units 701-1 to 701-n, the adder 702 and the 1/n unit 703. That is, the inter-line averaging refers to a process for adding the signals of the first column of the S497 line, the first column of the S498 line, the first column of the S499 line and the first column of the S500 line (SN1) and for multiplying the added signal by 1/n time. In this manner, the averaging process for each line is executed in order of the second column of the lines S497-S500, the third column of the lines S497-S500, . . . , and the $M^{th}$ column of the lines S497-S500.

Subsequently, high-frequency components are removed from the inter-line averaged signals by a low pass filter formed of the delay units 704 and 705, the multiplier units 706 to 708 and the adder 709. The signal b output from the control unit 715 determines the characteristics of the low pass filter.

As shown in FIG. 7, the high-level suppression unit 710 performs a non-linear process on the signal of a predetermined level or higher, which is output from the adder 709. In this embodiment, assuming that a level of the smear signal when the image signal output from the EM-CCD 3 is saturated (1.0 V in FIG. 5) is 100% (0.1 V in FIG. 5), the non-linear process is performed on the input signal whose smear signal level is 90% or higher by the high-level suppression unit 710. Further, clipping is performed on the input signal whose smear signal level is equal to or greater than 110%. The non-linear process of the high-level suppression unit 710 is controlled by the signal d which is output from the control unit 715. The smear correction can be prevented from becoming overcorrected by the non-linear process even when the image signal is saturated.

Further, the low-level suppression unit 711 performs a non-linear process on the signal of a predetermined level or lower, which is output from the high-level suppression unit 710 as shown in FIG. 7. In this embodiment, assuming that a level of the smear signal when the image signal output from the EM-CCD 3 is saturated (1.0 V in FIG. 5) is 100% (0.1 V in FIG. 5), the non-linear process is performed on the input signal whose smear signal level is equal to or less than 10% by the low-level suppression unit 711. The non-linear process of the low-level suppression unit 711 is controlled by the signal e which is output from the control unit 715. According to this non-linear process, random noises from the optical black area are not subtracted from random noises in the image pickup area, thereby making it possible to perform the smear correction by which a natural image is obtained.

The signal output from the low-level suppression unit 711 is input to the switching unit 712. The switching unit 712 is controlled by the signal output from the comparison unit 713. The comparison unit 713 compares the level of the signal output from the adder 709 with that of the signal c which is output from the control unit 715. If the level of the signal c is equal to or lower than that of the signal output from the adder 709, the comparison unit 713 controls the switching unit 712 so that the signal output from the low-level suppression unit 711 can be output as the signal g from the switching unit 712. On the other hand, if the level of the signal c is greater than that of the signal output from the adder 709 as a comparison result of the comparison unit 713, the comparison unit 713 controls the switching unit 712 so that the signal f output from the control unit 715 can be output as the signal g from the switching unit 712. The signal f may be set 0 (zero) or a predetermined value.

The comparison unit 713 compares levels of the smear correction signal and of a rated signal output from the image signal output unit 9. If the smear correction signal level is equal to or higher than, e.g., 10% of the rated signal level, the smear correction signal of 10% or more is subtracted from the image signal of 100% to provide the image signal of 90% or less. That is, the comparison unit 713 and the switching unit 712 prevent the smear correction signal from exerting an influence on the image signal itself.

The subtractor 714 subtracts the signal g, i.e. smear correction signal, from the signal A to thereby output the signal L where the smear signal has been reduced.

As another embodiment of the present invention, the operation of detection and correction of the smear signal output from the EM-CCD 3 will be described hereinafter with reference to FIGS. 2 and 8.

Figure 8:
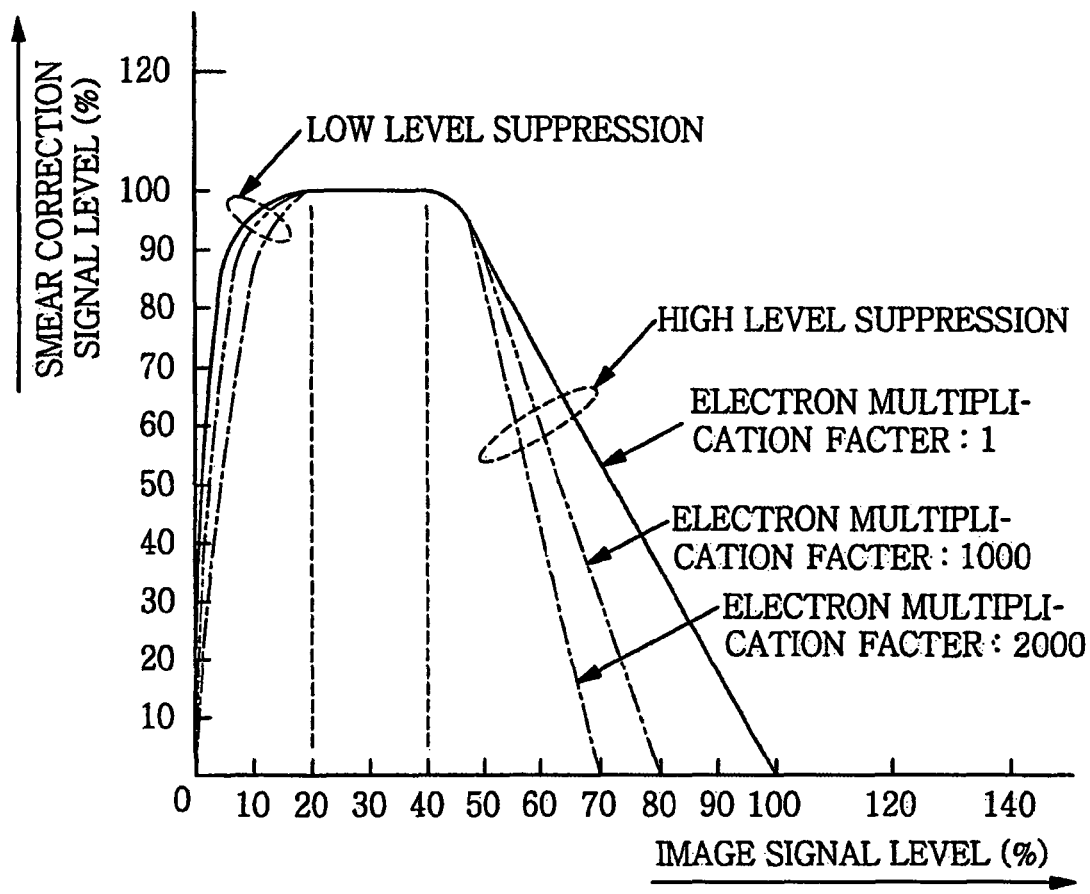
FIG. 8 is a diagram for explaining low-level and high-level suppressions of a smear correction with respect to an image signal level in accordance with another embodiment of the present invention.

FIG. 8 is a diagram for explaining the low-level and high-level suppressions of the smear correction signal in accordance with another embodiment of the present invention. Referring to FIG. 2, the description of the same operation as that in the aforementioned embodiment will be omitted.

If the electron multiplication factor of the EM-CCD 3 is set to 1000 times and a high-luminance object like a spotlight is photographed, the smear signal is also immediately saturated as shown in FIG. 6. In accordance with the another embodiment of the present invention, the characteristics of the high-level suppression unit 710 and the low-level suppression unit 711 are modified based on the electron multiplication factor of the EM-CCD 3 and the image signal level of the signal A. The level of the smear signal output from the adder 709 is set as 100%. A rated image signal level of the signal A is set as 100%.

In FIG. 8, a horizontal axis represents an image signal level output from the image signal level detector 716 (unit: percentage (%)), and a vertical axis represents a smear correction signal level output from the low-level suppression unit 711 (unit: percentage (%)).

The operation of the high-suppression unit 710 will now be described. In case of the electron multiplication factor of the EM-CCD 3 of 1, if the image signal level reaches 40%, the level of the smear correction signal output from the high-level suppression unit 710 starts to be reduced. When the image signal level is equal to or higher than 100%, the smear correction signal level is set to 0 (zero) or cut-off. If the electron multiplication factor of the EM-CCD 3 is 1000, the level of the smear correction signal output from the high-level suppression unit 710 starts decreasing as the image signal level reaches 40%. When the image signal level is equal to or higher than 80%, the smear correction signal level is set to 0 (zero) or cut-off.

Further, if the electron multiplication factor of the EM-CCD 3 is 2000, the level of the smear correction signal output from the high-level suppression unit 710 reduces as the image signal level reaches 40%. When the image signal level is equal to or higher than 70%, the smear correction signal level is set to 0 (zero) or cut-off. That is, the characteristics of the smear correction signal level is changed depending on the electron multiplication factor of the EM-CCD 3 and the image signal level of the signal A. By providing the high-level suppression unit 710 with such characteristics, the optimum smear correction can be achieved based on the electron multiplication factor of the EM-CCD 3 and the image signal level of the signal A.

The operation of the low-suppression unit 711 will be now described. If the electron multiplication factor of the EM-CCD 3 is 1, the level of the smear correction signal of the low-level suppression unit 711 starts to increase when the image signal level is 0%. If the image signal level is equal to or higher than 20%, the smear correction signal level is set to 100%. If the electron multiplication factor of the EM-CCD 3 is 1000, the level of the smear correction signal of the low-level suppression unit 711 starts to increase when the image signal level is 0%. If the image signal level is equal to or higher than 20%, the smear correction signal level is set to 100%.

Further, if the electron multiplication factor of the EM-CCD 3 is 2000, the level of the smear correction signal of the low-level suppression unit 711 starts to increase when the image signal level is 0%. If the image signal level is equal to or higher than 20%, the smear correction signal level is set to 100%. That is, the smear correction signal level can be changed depending on the electron multiplication factor of the EM-CCD 3 and the image signal level of the signal A. By providing the low-level suppression unit 711 with such characteristics, the optimum smear correction with reduced noise can be achieved based on the electron multiplication factor of the EM-CCD 3 and the image signal level of the signal A.

Although the high-level suppression unit 710 and the low-level suppression unit 711 are arranged in that order after the adder 709 in the aforementioned embodiments, the low-level suppression unit 711 and the high-level suppression unit 710 may be arranged in that order after the adder 709. Further, the high-level suppression unit 710 and the low-level suppression unit 711 can also have an amplifying function for level matching. If the amplifying function is provided, an amplification factor is controlled by the control unit 715.

In accordance with still another embodiment of the present invention, the smear correction unit 7 of FIG. 1 can detect and correct the smear signal by using a microprocessor such as a CPU (Central Processing Unit) or the like. An example of the operation for detecting and correcting the smear signal in accordance with this embodiment will be described with reference to FIG. 9.

Figure 9:
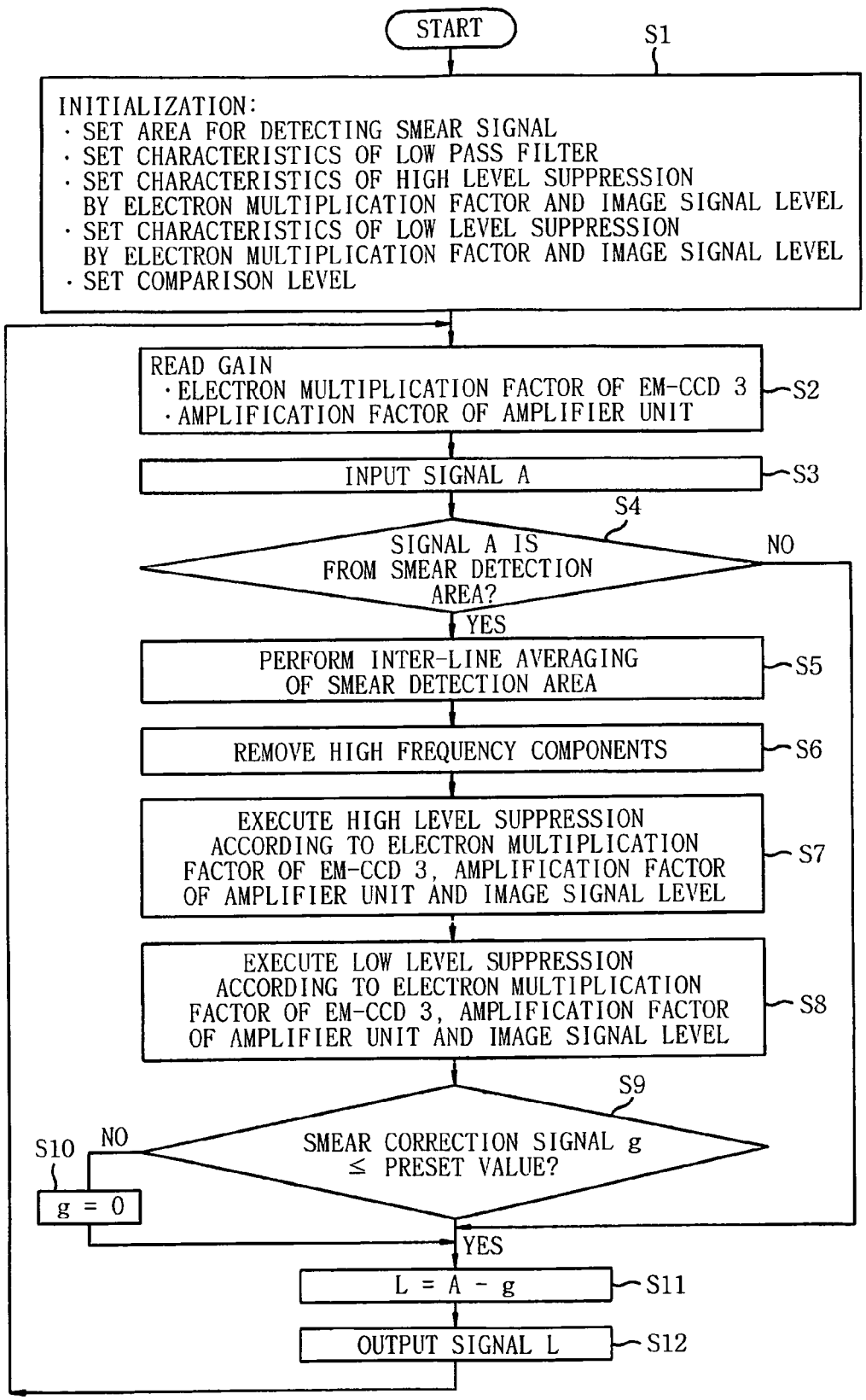
FIG. 9 is a flowchart for explaining the operation of smear signal detection and smear correction in accordance with still another embodiment of the present invention.

FIG. 9 is a flowchart for explaining operation processes for the detection of the smear signal and the smear correction in accordance with still another embodiment of the present invention.

In step S1 of FIG. 9, an initial setting is made for the smear signal detection area of the image pickup area of the EM-CCD 3; low pass filter characteristics, high-level suppression characteristics; based on the electron multiplication factor and the image signal level; low-level suppression characteristics based on the electron multiplication factor and the image signal level; and a comparison level is made. In step S2, the electron multiplication factor of the EM-CCD 3 and the amplification factor of the amplifier unit 5 are read out from the CPU 11. In step S3, the signal A is input to the smear correction unit 7. In step S4, it is determined whether or not the signal A is a signal of the smear detection area. If the signal A is the signal of the smear detection area, the process proceeds to step S5. Otherwise, step S11 follows.

In step S5, the inter-line averaging process of the signals of the smear detection area is performed and the process proceeds to step S6. In step S6, high-frequency components are eliminated by the low pass filter, and step S7 follows. In step S7, the high-level suppression process is carried out according to the electron multiplication factor of the EM-CCD 3, the amplification factor of the amplifier unit 5 and the image signal level, and step S8 follows. In step S8, the low-level suppression process is executed according to the electron multiplication factor of the EM-CCD 3, the amplification factor of the amplifier unit 5 and the image signal level, and the process proceeds to step S9.

In step S9, the level of the smear correction signal g, i.e. signal processed up to step S8 is compared with the initially set comparison level. If it is equal to or less than the comparison level, step S11 follows. Otherwise, the process proceeds to step S10. In step S10, the smear correction signal g is set to 0 (zero) or cut-off and step S11 then follows. In step S11, the smear correction signal g is subtracted from the signal A and step S12 follows. In step S12, the signal L is output.

In accordance with the above-described present invention, the smear signal is obtained from the predetermined pixels as the quasi-optical black area of the charge coupled device, and the low-level and high-level suppressions are performed on the obtained smear signal based on the image signal level of the pixels other than the predetermined pixels (second embodiment). Further, the suppressed smear signal is subtracted from the image signal level. Therefore an image signal from which noises such as a smear signal and the like have been reduced can be obtained without requiring an optical black area of the charge coupled device.

Although the present invention has been described in detail above, it is not limited to the image pickup device disclosed herein, but may be widely applied to various image pickup devices other than the above-described device.

While the invention has been shown and described with respect to the embodiments, it will be understood by those skilled in the art that various changes and modifications may be made without departing from the scope of the invention as defined in the following claims.

What is claimed is:

1. An image pickup device having an electron multiplying-charge coupled device, comprising:
a control unit for controlling an electron multiplication factor of the electron multiplying-charge coupled device;
an obtaining unit for obtaining signals output from a part of light-unshielded pixels of the electron multiplying-charge coupled device;
an averaging unit for performing an inter-line averaging process of the signals obtained by the obtaining unit;
a suppression unit for performing low-level and high-level suppressions on the signal averaged by the averaging unit;
an acquisition unit for acquiring image signals output from the light-unshielded pixels other than the part of the light-unshielded pixels of the electron multiplying-charge coupled device; and
a subtractor for subtracting the signal suppressed by the suppression unit from the image signals acquired by the acquisition unit.

2. The image pickup device of claim 1, further comprising:
a comparison unit for comparing a level of the signal averaged by the averaging unit with a predetermined level; and
a switching unit for making the output of the suppression unit zero according to a comparison result of the comparison unit.

3. The image pickup device of claim 1, wherein the suppression unit performs the low-level and high-level suppressions based on the electron multiplication factor of the electron multiplication factor control unit.

4. A noise reduction method of an image pickup device having an electron multiplying-charge coupled device, the method comprising the steps of:
controlling an electron multiplication factor of the electron multiplying-charge coupled device;
obtaining signals output from a part of light-unshielded pixels of the electron multiplying-charge coupled device;
performing an inter-line averaging process on the obtained signals;
performing low-level and high-level suppressions on the averaged signal;
acquiring image signals output from the light-unshielded pixels other than the part of the light-unshielded pixels of the electron multiplying-charge coupled device; and
subtracting the suppressed signal from the acquired image signals.

5. The noise reduction method of claim 4, further comprising the steps of:
comparing a level of the averaged signal with a predetermined level; and
subtracting the suppressed signal from the image signals according to a comparison result.

6. The noise reduction method of claim 4, wherein the low-level and high-level suppressions are performed based on the electron multiplication factor.

7. An image pickup device having an electron multiplying-charge coupled device, comprising:
a control unit for controlling an electron multiplication factor of the electron multiplying-charge coupled device;
an obtaining unit for obtaining signals output from light-unshielded predetermined pixels of the electron multiplying-charge coupled device;
an averaging unit for performing an inter-line averaging process of the signals obtained by the obtaining unit;
a suppression unit for performing low-level and high-level suppressions on the signal averaged by the averaging unit;
an acquisition unit for acquiring image signals output from the pixels other than the predetermined pixels of the electron multiplying-charge coupled device; and
a subtractor for subtracting the signal suppressed by the suppression unit from the image signals acquired by the acquisition unit.

8. The image pickup device of claim 7, further comprising:
a comparison unit for comparing a level of the signal averaged by the averaging unit with a predetermined level; and
a switching unit for making the output of the suppression unit 0 according to a comparison result of the comparison unit.

9. The image pickup device of claim 7, wherein the suppression unit performs the low-level and high-level suppressions based on the electron multiplication factor of the electron multiplication factor control unit.

10. A noise reduction method of an image pickup device having an electron multiplying-charge coupled device, the method comprising the steps of:
controlling an electron multiplication factor of the electron multiplying-charge coupled device;
obtaining signals output from light-unshielded predetermined pixels of the electron multiplying-charge coupled device;
performing an inter-line averaging process on the obtained signals;
performing low-level and high-level suppressions on the averaged signal;
acquiring image signals output from the pixels other than the predetermined pixels of the electron multiplying-charge coupled device; and
subtracting the suppressed signal from the acquired image signals.

11. The noise reduction method of claim 10, further comprising the steps of:
comparing a level of the averaged signal with a predetermined level; and
subtracting the suppressed signal from the image signals according to a comparison result.

12. The noise reduction method of claim 10, wherein the low-level and high-level suppressions are performed based on the electron multiplication factor.

13. An image pickup device having an electron multiplying-charge coupled device, comprising:
a control unit for controlling an electron multiplication factor of the electron multiplying-charge coupled device;
an electron multiplying-charge coupled device control unit for controlling the electron multiplying-charge coupled device not to read out image signals on pixels of predetermined lines of the electron multiplying-charge coupled device;

an obtaining unit for obtaining a signal output from at least a pixel of the predetermined lines of the electron multiplying-charge coupled device;

an acquisition unit for acquiring image signals output from pixels other than the pixels of the predetermined lines of the electron multiplying-charge coupled device; and a subtractor for subtracting the signal obtained by obtaining unit from the image signals acquired by the acquisition unit.

14. A noise reduction method of an image pickup device having an electron multiplying-charge coupled device, the method comprising the steps of:

controlling an electron multiplication factor of the electron multiplying-charge coupled device;

not reading out image signals on pixels of predetermined lines of the electron multiplying-charge coupled device;

obtaining a signal output from at least a pixel of the predetermined lines of the electron multiplying-charge coupled device;

acquiring image signals output from pixels other than the pixels of the predetermined lines of the electron multiplying-charge coupled device; and subtracting the obtained signal from the acquired image signals.

* * * * *